Oct. 11, 1938.   R. I. STEARNS, 2D   2,133,121
STEREOSCOPIC SCREEN AND METHOD OF STEREOSCOPIC VISION
Filed April 2, 1936
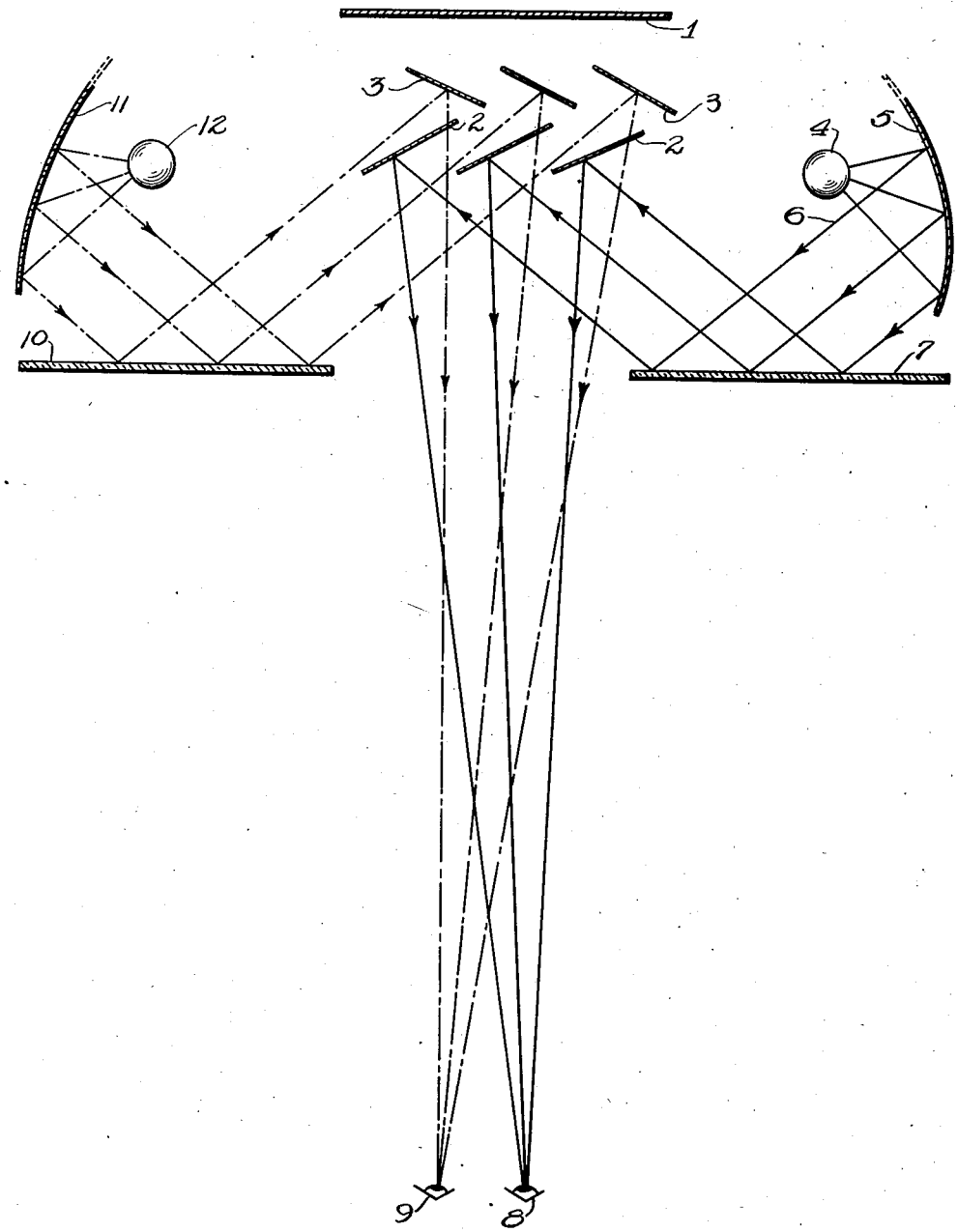
Inventor
Richard I. Stearns II Patented Oct. 11, 1938

2,133,121

UNITED STATES PATENT OFFICE 2,133,121

STEREOSCOPIC SCREEN AND METHOD STEREOSCOPIC VISION

Richard I. Stearns, II, Chicago, Ill.

Application April 2, 1936, Serial No. 72,363

2 Claims. (Cl. 88—29)

This invention relates to a new and improved method of obtaining stereoscopic vision from stereoscopic pictures. The stereoscopic pictures may comprise flat objects formed by the partial covering of one object by another. The perception of depth is believed to be due to the difference between the retina images on the two eyes, as in the use of binocular instruments.

The well known and simple method of making a stereoscopic picture visible to several people simultaneously is to provide offset left-eye and right-eye pictures of different colors, one over the other, and giving each observer spectacles of different colors for each eye.

Attempts to use prisms or diffraction gratings have not proved practical for group stereoscopic effects.

My invention comprises the use of an illuminated screen placed between the observers and the stereoscopic picture by means of which the observers will simultaneously receive three-dimensional effects.

An illustrative embodiment of my invention is shown in the accompanying drawing in which:

The figure is a diagrammatic drawing showing the position of the stereoscopic screen through which the picture is seen and the path of the rays of reflected light that is mixed with light reaching the eyes from the picture.

By my invention the use of different colored glasses, one for each eye, is eliminated and the same or equivalent results are obtained by placing near the stereoscopic picture 1 a transparent screen made up of reflecting surfaces 2, which reflect only light received from the right side, and similar reflecting surfaces 3 which reflect only light received from the left side. A colored source of light or lamp 4 is placed at the focus of a curved mirror 5, and the substantially parallel rays 6 are reflected from a plane mirror 7 to the reflecting surfaces 2 shown in section in the diagram. The reflecting surfaces 2 are transparent strips of Celluloid, glass or the like, and are each carefully adjusted to the plane or angle whereby the reflected rays of light will converge on the right eye 8.

In a similar manner rays from a second source of light are caused to converge on the left eye 9 by the reflection from the transparent strips 3 which receive light from the plane mirror 10 by way of the curved mirror 11 from the second source of light 12, placed at the focus of the curved mirror 11.

In the assembly of my apparatus the narrow transparent strips 2 are individually placed in position in a frame to form a stereoscopic screen. One of the strips 2 is carefully adjusted to reflect light received from the center of the mirror 7 to the position of the right eye 8, the remainder of the mirror being covered so as not to reflect light. Then each one of the narrow strips 2, which as shown, forms the front section of the screen, is set to reflect similarly from the same line on the mirror 7 to the eye 8. The effect of the combined reflecting strips is that of a concave mirror having for its focus the position of the eye 8. It will be apparent that in order to obtain concave mirror results the reflecting strips must be very narrow and the adjustment of each strip very exact. In a similar manner the reflecting strips 3 forming the rear section of the stereoscopic screen are each adjusted to focus on the left eye 9.

When a red light or a red colored film is used to illuminate the screen from the right side, the right eye will see a red color; with blue illumination on the screen from the left side the left eye sees a blue color, the amount of color imparted to the screen in either case being just enough to be equivalent to looking through a spectacle of the same color as that of the respective screen. If the reflecting strips have been set to obtain an offset of color focus substantially equivalent to the distance between the eyes 8 and 9, then practically the entire surfaces of the two fixed mirrors 7 and 10 may be uncovered, and the division of color observed by covering first one eye and then the other will be quite marked over a wide range at the positions of the eyes 8 and 9. When the eyes are moved to the left the reflecting angle to the right eye is reduced with an equal change of the incident angle, but the color remains the same. In a similar manner with respect to the left eye the reflected angle is increased and the angle of the incident ray is also increased. In operation, after the stereoscopic screen is adjusted and illuminated, the stereoscopic picture 1, which may comprise overlapping left-eye and right-eye stereoscopic pictures in red and blue respectively, is flooded with white light and is viewed through the stereoscopic screen, with the red and blue color values on the screen adjusted to separate the overlapping pictures. The effect is somewhat the same as though a red glass or screen were placed in front of one eye and a blue glass or screen were placed in front of the other eye. The amount of color required on the stereoscopic screen to obtain results equal to the use of red and blue spectacles is surprisingly small.

Experience has proved that the relative intensity of the colored lights as compared with the stereoscopic picture illumination, to obtain the best stereoscopic results, is easily controlled.

Although but one set of reflected rays is shown in the diagram it will be apparent that adjacent rays will be offset as to spacing to the observer and that the visible stereoscopic results cover quite a wide range of positions at which the observer may be located.

I claim:

1. The method of obtaining stereoscopic effects which consists in flooding overlapping red left-eye and blue right-eye stereoscopic pictures with white light and directing light from both pictures to both the left and right eye positions for the eyes of an observer, directing red light solely to the right eye of the observer of the picture to dominate the red image rays of the red picture for that eye and not the blue image rays of the blue picture, and simultaneously directing blue light solely to the left eye of the observer to dominate the blue image rays of the blue picture for that eye and not the red image rays of the red picture.

2. The method of obtaining stereoscopic effects which consists in flooding overlapping left-eye and right-eye stereoscopic pictures in complementary colors with light and directing light from both pictures to the left and right eye positions for the eyes of an observer, directing light of the color of the left-eye picture solely to the right eye of the observer of the picture to dominate the image rays coming to that eye from the left-eye picture and not the image rays of the right-eye picture, and simultaneously directing light of the color of the right-eye picture solely to the left eye of the observer to dominate the image rays coming to the left eye from the right-eye picture and not the image rays of the left-eye picture.

RICHARD I. STEARNS, II.